United States Patent
Dake et al.

(10) Patent No.: US 10,757,957 B2
(45) Date of Patent: Sep. 1, 2020

(54) CONCENTRATED PROTEIN COMPOSITIONS AND METHODS OF THEIR MAKING AND USE

(71) Applicant: International Dehydrated Foods, Inc., Springfield, MO (US)

(72) Inventors: Roger Lynn Dake, Springfield, MO (US); Stephanie Lynch, Springfield, MO (US); Rodney McFadden, Monett, MO (US)

(73) Assignee: INTERNATIONAL DEHYDRATED FOODS, INC., Springfield, MO (US)

( * ) Notice: Subject to any disclaimer, the term of this patent is extended or adjusted under 35 U.S.C. 154(b) by 0 days.

(21) Appl. No.: 14/698,150

(22) Filed: Apr. 28, 2015

(65) Prior Publication Data

US 2015/0305369 A1    Oct. 29, 2015

Related U.S. Application Data

(60) Provisional application No. 61/985,270, filed on Apr. 28, 2014.

(51) Int. Cl.
| | |
|---|---|
| *A23J 3/00* | (2006.01) |
| *A23J 3/04* | (2006.01) |
| *A23L 2/66* | (2006.01) |
| *A23K 50/80* | (2016.01) |
| *A23K 10/20* | (2016.01) |
| *A23K 50/70* | (2016.01) |
| *A23K 50/75* | (2016.01) |
| *A23K 50/42* | (2016.01) |
| *A23K 40/10* | (2016.01) |
| *A23K 40/00* | (2016.01) |
| *A23K 50/50* | (2016.01) |
| *A23L 33/17* | (2016.01) |

(52) U.S. Cl.
CPC ............... *A23J 3/04* (2013.01); *A23K 10/20* (2016.05); *A23K 40/00* (2016.05); *A23K 40/10* (2016.05); *A23K 50/42* (2016.05); *A23K 50/50* (2016.05); *A23K 50/70* (2016.05); *A23K 50/75* (2016.05); *A23K 50/80* (2016.05); *A23L 2/66* (2013.01); *A23L 33/17* (2016.08)

(58) Field of Classification Search
CPC ............ A23J 3/04; A23K 50/70; A23K 10/20
See application file for complete search history.

(56) References Cited

U.S. PATENT DOCUMENTS

| | | | | |
|---|---|---|---|---|
| 4,103,038 A | * | 7/1978 | Roberts | A23J 3/08 426/601 |
| 4,139,648 A | * | 2/1979 | Small | A23J 3/26 264/83 |
| 5,330,778 A | * | 7/1994 | Stark | A23D 7/015 426/531 |
| 5,382,444 A | * | 1/1995 | Roehrig | A23L 5/20 426/417 |
| 6,005,073 A | | 12/1999 | Hultin et al. | |
| 8,057,839 B2 | * | 11/2011 | Bovetto | A23J 3/08 426/520 |
| 2007/0077333 A1 | * | 4/2007 | Maeda | A23J 3/341 426/56 |
| 2007/0148307 A1 | | 6/2007 | Sherwood et al. | |
| 2009/0238930 A1 | * | 9/2009 | Sathivel | A23J 1/04 426/238 |
| 2010/0048873 A1 | | 2/2010 | Lotz et al. | |
| 2012/0171352 A1 | * | 7/2012 | Kelleher | A23J 1/02 426/657 |

FOREIGN PATENT DOCUMENTS

| | | | |
|---|---|---|---|
| CA | 2210464 A1 | 2/1998 | |
| CN | 101503727 A | 8/2009 | |
| EP | 1337157 B1 | 2/2006 | |
| JP | S60 248155 A | 12/1985 | |
| JP | 10-66543 | 3/1998 | |
| JP | 10-179038 | 7/1998 | |
| JP | 2007-527384 | 9/2007 | |
| JP | 2001-507596 | 3/2010 | |
| WO | WO 97/02489 * | 1/1997 | ............ G01N 33/02 |
| WO | 9911656 A1 | 3/1999 | |
| WO | WO 2005/002605 A1 | 1/2005 | |
| WO | 2011049991 A2 | 4/2011 | |

OTHER PUBLICATIONS

CaseyMeat Science 1986 vol. 12 No. 4 pp. 1890293 "Collagen content of meat carcasses of known history" (Year: 1986).*
PCT Patent Application Serial No. PCT/US2015/027934 International Search Report and Written Opinion dated Jul. 27, 2015, 17 pages.
Extended European Search Report dated Nov. 17, 2017 for European Patent Application No. 15786307.7, 9 pages.
Japanese Patent Application No. 2016-564603; Notice of Reasons for Rejections dated Jun. 12, 2019; 15 pgs.
Japanese Patent Application No. 2016-564603; Notice of Reasons for Rejection dated Feb. 19, 2019; 16 pages.

* cited by examiner

*Primary Examiner* — Felicia C Turner
(74) *Attorney, Agent, or Firm* — Lathrop GPM LLP

(57) ABSTRACT

This disclosure provides a highly concentrated protein composition and the processes of making the same. The compositions are shelf-stable, easy to use and have excellent nutritional values as compared to other protein products. The compositions may be prepared from animal sources, such as chickens or turkeys.

17 Claims, No Drawings

CONCENTRATED PROTEIN COMPOSITIONS AND METHODS OF THEIR MAKING AND USE

RELATED APPLICATION

This application claims priority to U.S. patent application Ser. No. 61/985,270 filed Apr. 28, 2014, the entire content of which is hereby incorporated by reference into this application.

BACKGROUND

1. Field of the Invention

This disclosure relates to a process for preparing concentrated protein compositions from animal meat or other animal parts. More particularly, the disclosure pertains to concentrated protein compositions prepared from poultry and methods of making the same.

2. Description of Related Art

Protein is an essential nutrient for humans and animals. Traditional sources of proteins include, for example, animal meat (e.g., poultry, beef, pork, fish, etc.) and various plants (e.g., soybean or pea) that are rich in protein. Convenience foods such as bars, shakes, and smoothies are becoming more and more popular and have become important sources of protein intake. Other protein-rich products such as protein shakes, are used by athletes to maintain or grow muscle mass.

Protein powders are used extensively in making these convenience foods or specialty products. To date, most protein powders are obtained from plant sources, such as soy or pea. Other than protein powders prepared from milk, whey, or eggs, high-protein powders from other animal sources have not been reported or used in such protein-rich products.

SUMMARY

The disclosed instrumentalities advance the art by providing methods for preparing a high quality, high concentration protein powder from animal sources. Examples of animal sources may include but are not limited to meat or other body parts from birds, cattle, pigs, among others. Examples of birds may include but are not limited to chickens or turkeys. In one aspect, the high protein composition may contain more than 70%, 75%, 80%, 90%, or 95% (w/w) of protein but less than 15%, 12%, 10%, 8%, or 5% (w/w) of fat. Unless otherwise specified, weight percentages in this disclosure are measured on a dry matter basis.

In one embodiment, the composition may be prepared from a starting material derived from an animal source. Examples of the starting material may include but are not limited to meat, boneless meat or poultry trims from chickens or turkeys. In one aspect, the starting material may be processed to generate a processed material in the form of fine particles or powders. This processing step (a) may include, for example, mechanical grinding of the starting material into much smaller pieces or particles. The processed material from step (a) may be cooked (or incubated) with water at an elevated temperature for a period of time to form a slurry. This incubation step (b) may be carried out in a vessel or a pot. In another aspect, the material is cooked to doneness without excessive temperature or time to preserve optimum protein quality by preventing unnecessary protein denaturation.

Following the first cooking period, liquids may be separated and removed from the solids of the first slurry to obtain a first solid fraction. In one aspect, the separation and removal step (c) may be carried out by using a high speed decanter. The high speed decanter may use centrifugal force to separate liquid from solid fractions. The removed liquids may be used for other purposes. Significant amount of fat is removed in this step (c).

In another embodiment, the first solid fraction obtained from step (c) may be further cooked or incubated with water at an elevated temperature for a period of time to form a second slurry. Some agitation may be used during this second cooking step (d) to assure adequate mixing and fractionation of soluble proteins and fat from the insoluble protein matrix. The elevated temperature in steps (b) and (d) may be between 160 F and 300 F, between 180 F and 250 F, between 180 F and 230 F, or between 200 F and 230 F. The first and second period of time in steps (b) and (d) may be the same or may be different, and both may be between 1 and 3 hours, or about 2 hours.

Following the second cooking period, liquids may be separated and removed from the solids of the second slurry to obtain a second solid fraction. The separation and removal step (c) may be carried out by using the same type of high speed decanter as in step (c). More fat and soluble protein are removed in this step (e).

The second solid fraction may then be collected and may be dried and processed into a meal or fine powder. Examples of drying methods may include but are not limited to air drying, spray drying, or other methods known in the art.

In another embodiment, the steps (d) and (e) may be repeated once or more times, as needed.

In one embodiment, no pH adjusting agent is added during the disclosed process to adjust the pH of the slurry or any intermediate products. In another embodiment, a pH adjusting agent may be added during the disclosed process to adjust the pH of the slurry or any intermediate products.

In another embodiment, the method may further contain an acidification step to reduce the pH of the protein composition obtained above. In another embodiment, the acidification step may include adding an acidic agent to the slurry obtained above or partially hydrolyzing the slurry, wherein the acidic agent is selected from the group consisting of carbonated water, carbon dioxide gas, and combination thereof. In one aspect, acid hydrolysis may help removing fat (lipid) from the composition. In another aspect, acid hydrolysis may facilitate selective fractionation of proteins and improve amino acid profiles, especially to increase the content of essential amino acids.

In another embodiment, the method may further contain a microfiltration step which selectively enriches one or more amino acids or one or more proteins in the composition obtained above. By way of example, the microfiltration step may be performed by passing the slurry through a membrane filter system designed to either remove or retain selected proteins and/or amino acids.

The high protein composition thus obtained may be used in numerous products, such as, by way of example, protein drink, smoothies, or other nutritional beverages.

In another embodiment, the disclosed high protein, low fat compositions may contain high quality proteins comparable to those of egg proteins. In one aspect, the disclosed composition may have a Protein Efficiency Ratio (PER) score of between 80 and 100, or between 85 and 100 as compared to egg protein on PER tests performed on chickens. In another aspect, the disclosed composition may have a Protein Efficiency Ratio (PER) score of between 85 and 100 as compared to casein protein on PER tests performed on rats. In another aspect, the total amino acids in the disclosed composition may score at least 90, 95, 98, or 99 Protein Digestibility Corrected Amino Acid Score (PD-CAAS). In another aspect, the composition may contain amino acids having an amino acid profile that scores a perfect 100 Protein Digestibility Corrected Amino Acid Score (PDCAAS).

In another embodiment, the total amino acids in the disclosed composition may have a fecal digestibility of at least 95, 96, 97, 98, 99 or higher. In another embodiment, the total amino acids in the disclosed composition may have an ileal digestibility of at least 95, 96, 97, 98, 99 or higher. Fecal and ileal digestibility may be measured according to Darragh and Hodgkinson, Journal of Nutrition, vol. 130, no. 7, 1850S-1856S (2000).

In another embodiment, the final high protein composition may be processed into a finely granulated or a powder form. For example, the composition may have an average particle size smaller than 500 microns, smaller than 300 microns, or smaller than 100 microns. In another embodiment, the final high protein composition may be in a texturized form, wherein the particle size ranges from 1-2 mm.

In another embodiment, a process is disclosed herein for improving protein quality of a composition derived from an animal source. The process may include at least the step of separating or removing from the composition one or more proteins which have PER scores of less than 60, 70, or 80.

In another embodiment, the composition of the present disclosure may be used as a dietary supplement or may be used as a component of a dietary supplement. The supplement may serve various functionalities when administered to a living organism, such as a mammal, a fish, a bird or a domestic animal. These functionalities may include but are not limited to promoting growth of certain gut bacterium, maintaining a specific gut microbiome, enhancing immune response, modulating inflammatory response, among others. In one particular aspect, the disclosed composition may be used as a prebiotic that promotes gut microbiome or helps balance the different bacterial species in the gut of the organism. The term microbiome refers to the ecological community of commensal, symbiotic, and pathogenic microorganisms that share a body space within a mammal.

DETAILED DESCRIPTION

The present disclosure provides processes for making a concentrated protein composition. The disclosed processes improve upon existing art by increasing the protein concentration while lowering the fat content of the compositions.

In one aspect of this disclosure, a shelf-stable concentrated protein composition from animal sources is provided. Similar to plant and dairy based proteins (e.g., whey or soy powders), the disclosed high protein composition is convenient to use and easy to process by the food industry. In contrast to plant and dairy based proteins, the disclosed protein composition is from animal meat sources. In another aspect, the high protein composition is in an easy-to-use powder form.

In another embodiment, this disclosure relates to a process of making a complete, high quality, high protein, and low fat composition from poultry such as chicken and turkey. The composition is available to commercial food processors and consumers in a convenient and shelf-stable powder form.

In one aspect, the disclosed protein composition contains about the same percentage of proteins as soy and whey protein concentrates and isolates. In another aspect, the amino acid profile of the disclosed high protein composition is well balanced. Table 1 shows amino acid profiles of one exemplary protein composition (Internal Ref Code 3147) prepared according to the present disclosure. In a study to evaluate the quality of proteins based on amino acid requirements by humans and on protein digestibility, the disclosed protein composition is shown to have a maximum score for Protein Digestibility Corrected Amino Acid Score ("PDCAAS").

TABLE 1

Amino acid profile of a composition (Internal Ref Code 3147) prepared according to the disclosed Single-Decant method

|  | % of AA on solids basis |
|---|---|
| Aspartic Acid (w/w) | 6.83 |
| Threonine (w/w) | 3.30 |
| Serine (w/w) | 3.02 |
| Glutamic Acid (w/w) | 11.52 |
| Glycine (w/w) | 4.55 |
| Alanine (w/w) | 4.38 |
| Valine (w/w) | 3.48 |
| Methionine (w/w) | 2.05 |
| Isoleucine (w/w) | 3.49 |
| Leucine (w/w) | 6.06 |
| Tyrosine (w/w) | 2.61 |
| Phenylalanine (w/w) | 3.50 |
| Histidine (w/w) | 2.00 |
| Lysine (w/w) | 6.55 |
| Arginine (w/w) | 5.29 |
| Proline (w/w) | 5.64 |
| Hydroxyproline (w/w) | 1.68 |
| Cysteine (w/w) | 0.90 |
| Tryptophan (w/w) | 0.69 |
| Total | 77.54 |

Table 2 shows the typical amino acid composition in total chicken meat protein (USDA SR-21 released Dec. 7, 2011 by U.S. Department of Agriculture) for purpose of comparison.

TABLE 2

Typical amino acid composition of meat protein from chickens

|  | Weight (mg) | % of AA |
|---|---|---|
| Aspartic Acid | 3870 | 8.92 |
| Threonine | 1834 | 4.23 |
| Serine (w/w) | 1494 | 3.44 |
| Glutamic Acid | 6504 | 15.0 |
| Glycine | 2133 | 4.91 |
| Alanine | 2369 | 5.46 |
| Valine | 2155 | 4.97 |
| Methionine | 1203 | 2.77 |
| Isoleucine | 2293 | 5.28 |
| Leucine | 3259 | 7.51 |
| Tyrosine | 1466 | 3.38 |
| Phenylalanine | 1724 | 3.97 |
| Histidine | 1348 | 3.11 |
| Lysine | 3689 | 8.52 |
| Arginine | 2619 | 6.03 |
| Proline | 1785 | 4.11 |
| Hydroxyproline | ND | ND |

TABLE 2-continued

Typical amino acid composition of meat protein from chickens

|  | Weight (mg) | % of AA |
| --- | --- | --- |
| Cysteine | 556 | 1.30 |
| Tryptophan | 507 | 1.17 |
| Total | 43400 | 100 |

ND: Not Determined.

Table 3 shows the amino acid profiles of another composition (Internal Ref code 3185) prepared according to the Double-Decant method. It is worth noting that the percentage of hydroxyproline is relatively low (e.g., as low as 0.59%) as compared to protein composition prepared from poultry by using other methods. Protein composition low in hydroxyproline is likely to be low in collagens. Thus, the disclosed low-hydroxyproline composition may be used for people desiring a low-collagen diet.

TABLE 3

Amino acid profile of a composition (Ref code 3185) prepared according to the Double-Decant method

|  | % of AA on solids basis |
| --- | --- |
| Aspartic Acid (w/w) | 8.25 |
| Threonine (w/w) | 4.16 |
| Serine (w/w) | 3.65 |
| Glutamic Acid (w/w) | 12.69 |
| Glycine (w/w) | 4.23 |
| Alanine (w/w) | 5.12 |
| Valine (w/w) | 4.50 |
| Methionine (w/w) | 2.43 |
| Isoleucine (w/w) | 4.20 |
| Leucine (w/w) | 7.19 |
| Tyrosine (w/w) | 3.14 |
| Phenylalanine (w/w) | 3.72 |
| Histidine (w/w) | 2.36 |
| Lysine (w/w) | 7.73 |
| Arginine (w/w) | 5.92 |
| Proline (w/w) | 3.70 |
| Hydroxyproline (w/w) | 0.59 |
| Cysteine (w/w) | 0.92 |
| Tryptophan (w/w) | 1.17 |
| Total | 85.67 |

In one embodiment, the disclosed composition of may contain less than 0.6%, 0.8%, or less than 1% of hydroxyproline by weight of total amino acids in the composition.

In another embodiment, because the disclosed high protein compositions provide complete amino acid profile in a single high quality protein source, there is no need to mix multiple protein sources or to supplement any particular amino acids. Indeed, as shown by Protein Efficiency Ratio (PER) testing, the high protein compositions of the present disclosure are comparable to the highest quality proteins such as those from eggs, while in many cases, exceeding the scores of whey and soy proteins. Protein efficiency ratio (PER) is measured based on the weight gain of a test subject divided by its intake of a particular food protein during the test period.

Due to conditions such as kidney disease, some people must limit their dietary protein intake. For these people, the use of a concentrated, complete and high quality protein may allow intake of essential amino acids within the least amount of overall dietary protein.

In another embodiment, the disclosed protein composition may be used in making a number of different products, which may include but are not limited to bars, baked goods, pasta, nutritional drinks, among others. In one aspect, the disclosed compositions possess a smooth texture and a non-gritty and non-sandy mouth feel. In another aspect, the disclosed protein composition may be processed into very fine particulate sizes so that they may be used in liquid products like shakes, protein sports drinks, and other beverages that require smooth texture and mouth feel. In another aspect, the particle size is smaller than 500 microns. In another aspect, the particle size is smaller than 400, 300, 200, 100 or even 50 microns.

In another embodiment, chicken raw materials may be fractionated with non-protein components removed. In another embodiment, the disclosed process may also improve the amino acid profile of the compositions by removing protein components that are of lesser nutritional value. Mechanically separated chicken (MSC) type products can be fractionated into special protein products after cooking by removing fats and soluble protein according to the disclosed method. The resulting protein product is not merely mechanically separated chicken, but is an extract of mechanically separated chicken which has superior nutritional qualities as compared to raw MSC.

In one aspect, the disclosed process may be used to turn lower value raw poultry materials into a high value protein powder without using additives. By way of example, several representative steps of one of the embodiments of the disclosed processes are described below:

1. Raw chicken muscle such as boneless meat or trims may be the starting raw material. Alternatively, raw chicken frames and carcasses may be converted to mechanically separated chicken using equipment and techniques available in the art.

2. This material may be finely ground to allow optimum fractionation of protein from fat and other non-protein materials. Pieces of the starting raw material may be ground to less than 5 mm, 4 mm, 3 mm, 2 mm, or less than 1 mm size.

3. The finely ground chicken starting material may be cooked to doneness without excessive temperature or time. This may help preserve optimum quality by preventing unnecessary protein denaturation.

4. The cooked chicken slurry may then be passed through a high speed decanter that uses centrifugal force to separate liquid from solid fractions. The liquids are removed and sent away for other uses.

5. A significant amount of fat is removed in this step. Significant amounts of soluble proteins and nucleotides, as well as other compounds, are also removed. The resulting high-protein composition contains proteins that are of higher quality as shown by their higher nutritional value in promoting body growth and muscle growth in humans or domestic animals.

6. The cooked decanted chicken may be sent to a second cooking vessel and mixed with an optimum amount of water.

7. The chicken may be cooked according to various times and temperatures as needed to meet particular product specifications and characteristics. Some agitation may be used to assure good mixing and fractionation of soluble proteins and fat from the insoluble protein matrix. For example, the slurry might be cooked for 2 hours at 200 F to 230 F.

8. The twice cooked chicken slurry may be passed through a second centrifugal decanter to remove additional fat and to remove more soluble proteins.

9. The twice cooked and decanted product at this point may be cooked and decanted a third or multiple times as needed to meet the specifications for a particular need.

10. The resultant cooked and decanted protein-enhanced product may be dried into a meal or fine powder by choice of drying methods such as air drying, spray drying, and other means currently available in the art. Alternatively, the resultant protein-enhanced product may be dried in a drum dryer or other equipments known in the field to provide a final product in a texturized form with more body chew and mouth feel.

The multiple cooking and high speed centrifugal decanting steps have not been reported in the art and may have contributed to the various advantages described here. Moreover, the cooking and fractionation cycles may have contributed to the increase in protein quality (as measured by digestibility and PER testing). The soluble protein removed in the disclosed process has been found to be of lower nutritional quality in animal feeding studies as related to growth rate. PER scores in chicks, rats, and dogs are significantly lower for rations comprised of these soluble proteins. Thus, removal of the lower quality proteins may have contributed, at least in part, to the enhanced quality of the disclosed high protein composition.

An unexpected benefit from the disclosed process is the improvement in amino acid ratios as shown by an increase in amino acid scores such as Protein Digestibility Corrected Amino Acid Score (PDCAAS) and Digestible Indispensable Amino Acid Score (DIAAS). Another unexpected result is that the fraction of soluble proteins removed is of lower quality than the remaining proteins, as shown by digestibility and PER results from feeding studies. As shown in the top three rows in Table 4, the high protein compositions of the instant disclosure show PER scores that are very close to egg protein. While the data in Table 4 show PER assay performed on chicks, similar results have been obtained from rats, dogs, and fish.

TABLE 4

Results from Chick PER assays

| Code Key: | gain/chick (g) | feed/chick (g) | G:F | PER | PER % Egg |
|---|---|---|---|---|---|
| High Protein Chicken Powder Batch 1 | 119.58 | 302.63 | 0.4 | 3.96 | 87.95 |
| High Protein Chicken Powder Batch 2 | 125.58 | 297.25 | 0.42 | 4.22 | 93.83 |
| High Protein Chicken Powder Batch 1 with antioxidant | 118.79 | 292.96 | 0.4 | 4.04 | 89.76 |
| Whey Protein Concentrate | -12.96 | 89.11 | -0.15 | -1.47 | -32.57 |
| Whey Protein Isolate | -30.96 | 70.88 | -0.44 | -4.38 | -97.33 |
| Pea Protein Concentrate | -11.46 | 108.88 | -0.11 | -1.06 | -23.54 |
| Pea Protein Isolate | -3.86 | 124.75 | -0.03 | -0.32 | -7.03 |
| Spray Dried Egg | 128.04 | 284.08 | 0.45 | 4.5 | 100 |
| Soy Protein Concentrate | 49.04 | 224.5 | 0.22 | 2.19 | 48.65 |
| Soy Protein Isolate | 28.29 | 169.08 | 0.16 | 1.65 | 36.54 |
| Whey Protein Isolate 2 | -52.22 | 73.79 | -0.7 | -6.98 | -155.14 |
| Whey Protein Concentrate 2 | -22.58 | 89.29 | -0.26 | -2.55 | -56.73 |
|  | -33.6 | 116.44 | -0.29 | — | — |

G:F is the ratio between weight gain and the amount of feed consumed.

In one embodiment, the high protein compositions may be used as an ingredient in food or beverage products. In another embodiment, the composition obtained may be used in numerous applications as a wholesome, all natural ingredient. The disclosed extract may also be used to prepare protein drinks, smoothies, or other nutritional beverages.

It is to be recognized that the disclosed composition differs from Mechanically Separated Chicken (MSC) at least in that the disclosed composition contains various high quality proteins extracted from MSC, with various low quality proteins from MSC removed.

It is to be noted that, as used in this specification and the claims, the singular forms "a," "an," and "the" include plural referents unless the context clearly dictates otherwise. Thus, for example, reference to "a device" may include reference to one device, as well as two or more devices, unless the context clearly limits the reference to one device.

The terms "between" and "at least" as used herein are inclusive. For example, a range of "between 5 and 10" means any amount equal to or greater than 5 but equal to or smaller than 10.

Unless otherwise specified, the percentage of certain component in a composition is by weight of total solid. Various commercially available products may have been described or used in this disclosure. It is to be recognized that these products are cited for purpose of illustration only. Certain physical and/or chemical properties and composition of the products may be modified without departing from the spirit of the present disclosure. One of ordinary skill in the art may appreciate that under certain circumstances, it may be more desirable or more convenient to alter the physical and/or chemical characteristics or composition of one or more of these products in order to achieve the same or similar objectives as taught by this disclosure.

EXAMPLES

The following examples are provided to illustrate the present invention, but are not intended to be limiting. The reagents, materials and instruments are presented as typical components, and various substitutions or modifications may be made in view of the foregoing disclosure by one of skills in the art without departing from the principle and spirit of the present invention.

Example 1 Preparation of Concentrated Protein Compositions from Poultry

Mechanically separated chicken was cooked to a temperature of at least 200° F. (about 93.3° C.) for more than 5 minutes but less than 20 minutes (first cooking period). Broth and fat were removed from the cooked chicken slurry by using high speed centrifugal decanter equipment.

The resultant insoluble and defatted solids fraction was added to equal parts of water and the mixture was cooked for two hours at 200° F. (second cooking period). The mixture was intermittently mixed during the second cooking period. The second cooking period may be repeated for one or more times, as desired. In this Example, the second cooking period is the final cooking cycle. At the end of the final cooking cycle, the product was pumped through a centrifugal decanter where fat and broth liquids were removed. The decanted product was dried and then subject to analysis in a lab. The dried product typically contained (on a solid basis) 85.7% to 86.8% of protein by weight, 8.9% to 11.8% of fat by weight, and 3.7% to 5.9% of ash by weight.

Example 2 Preparation of High Protein Powder from Poultry Using the Double-Decant Method Disclosed here is production of finished dried chicken protein powder using a process of this disclosure. Fresh, raw chicken frames were passed through a mechanical deboning system and the meaty protein portion was fully cooked in a continuous system. The cooked product was then passed through a first centrifugal decanter separating the insoluble protein fraction from the liquid soluble and fat fractions. A significant amount of the original mechanically separated chicken was thus removed and a high protein meaty fraction was obtained. This insoluble high protein low fat fraction was then rehydrated with at least equal parts hot water and further heated with agitation. This slurry was then passed through a second decanter which again removed soluble protein and fat. The double decanted protein fraction was then blended with hot water, heated to a temperature of more than 165° F., then pumped through a mill, homogenized, and spray dried. The finished powder had 84.5% protein, 8% fat, 3.1% moisture, and 4.1% ash. This high protein powder was packaged ready to be used as a high protein wholesome ingredient. It represents a highly nutritious highly valued food protein ingredient product fractionated from a lower valued byproduct from the poultry industry.

Example 3 Preparation of High Protein Powder from Poultry in a Commercial Plant

The processes of Example 1 or 2 are scaled up to produce larger quantity of high protein composition. The prepared compositions may be produced and packaged in a commercial plant.

REFERENCES

All references listed below and those publications, patents, patent applications cited throughout this disclosure are hereby incorporated expressly into this disclosure as if fully reproduced herein.

Kelleher et al., US Patent Application Publication US2015/ 0099866. USDA SR-21 released Dec. 7, 2011 by U.S. Department of Agriculture.

We claim:

1. A composition prepared from poultry, said composition comprising more than 75% (w/w) of substantially insoluble poultry protein and less than 15% (w/w) of fat on a dry matter basis, and wherein said composition comprises less than 1% of hydroxyproline by weight of total amino acids in said composition.

2. The composition of claim 1, wherein said composition has a Protein Efficiency Ratio (PER) score of between 85 and 100 as compared to casein on PER tests performed on rats.

3. The composition of claim 1, wherein said composition comprises amino acids having an amino acid profile that scores 95 Protein Digestibility Corrected Amino Acid Score (PDCAAS) or higher.

4. The composition of claim 1, wherein said composition comprises amino acids having a fecal digestibility of at least 97 or higher.

5. The composition of claim 1, wherein said composition comprises amino acids having an ileal digestibility of 96 or higher.

6. The composition of claim 1, wherein said composition is in a finely granulated or a powder form.

7. The composition of claim 1, wherein said composition is in a texturized form.

8. The composition of claim 1, wherein said composition has an average particle size smaller than 500 microns.

9. The composition of claim 1, wherein said composition comprises between 75% to 95% (w/w) of protein.

10. The composition of claim 1, wherein said composition comprises less than 5% (w/w) of fat.

11. The composition of claim 1, wherein said composition is prepared by a method comprising:
(a) processing a starting material from poultry to generate a processed material in the form of fine particles or powders,
(b) incubating said processed material from step (a) with water in a vessel at an elevated temperature for a first period of time to form a slurry,
(c) removing liquids from said slurry to obtain a first solid fraction,
(d) incubating said first solid fraction from step (c) with water at an elevated temperature for a second period of time to form a second slurry,
(e) removing liquids from said second slurry to obtain a second solid fraction, and
(f) collecting said second solid fraction to obtain said composition.

12. The composition of claim 1, wherein said composition is used as a dietary supplement or as a component of a dietary supplement.

13. The composition of claim 1, wherein said composition is used as a prebiotic supplement or as a component of a prebiotic supplement.

14. The composition of claim 1, wherein said composition is used to alter or to maintain a gut microbiome of a mammal.

15. The composition of claim 1, wherein said composition is used to achieve or maintain a balance of bacterial species in the intestinal tract of a mammal.

16. The composition of claim 1, wherein said composition is used as a component of a protein formulation to be administered to a mammal, said protein formulation serving at least one function selected from the group consisting of promoting growth of certain gut bacterium in said mammal, maintaining a specific gut microbiome, enhancing immune response, modulating inflammatory response of said mammal, and combination thereof.

17. The composition of claim 1, wherein said composition is used as a component of a protein formulation to be administered to a living organism selected from the group consisting of a fish, a bird, and a domestic animal, said composition serving at least one function selected from the group consisting of promoting growth of certain gut bacterium in said organism, maintaining a specific gut microbiome, enhancing immune response, modulating inflammatory response of said organism, and combination thereof.

* * * * *